United States Patent Office 3,473,920
Patented Oct. 21, 1969

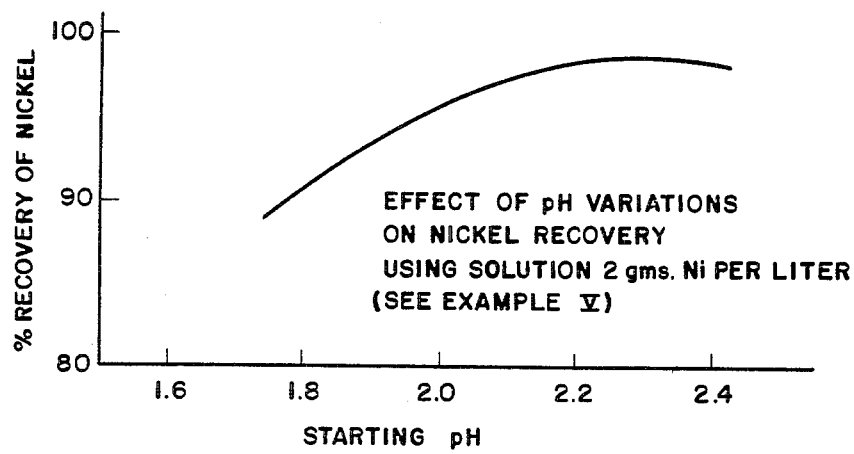
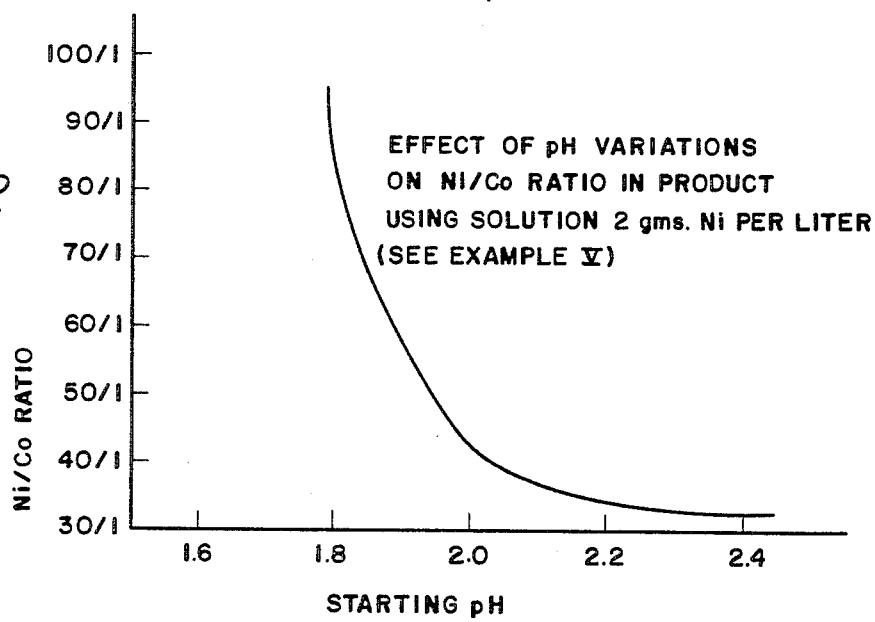
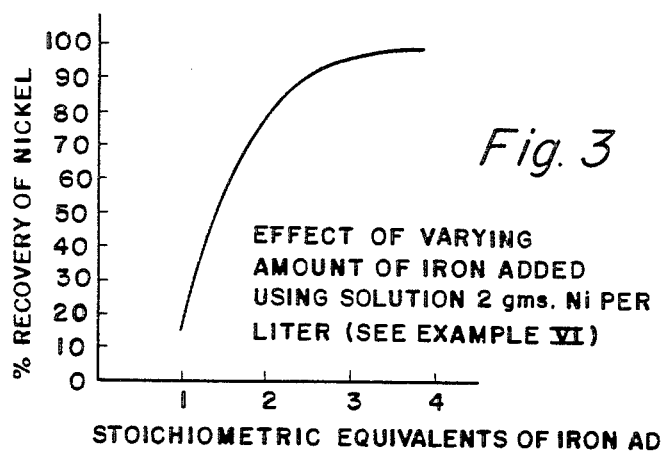

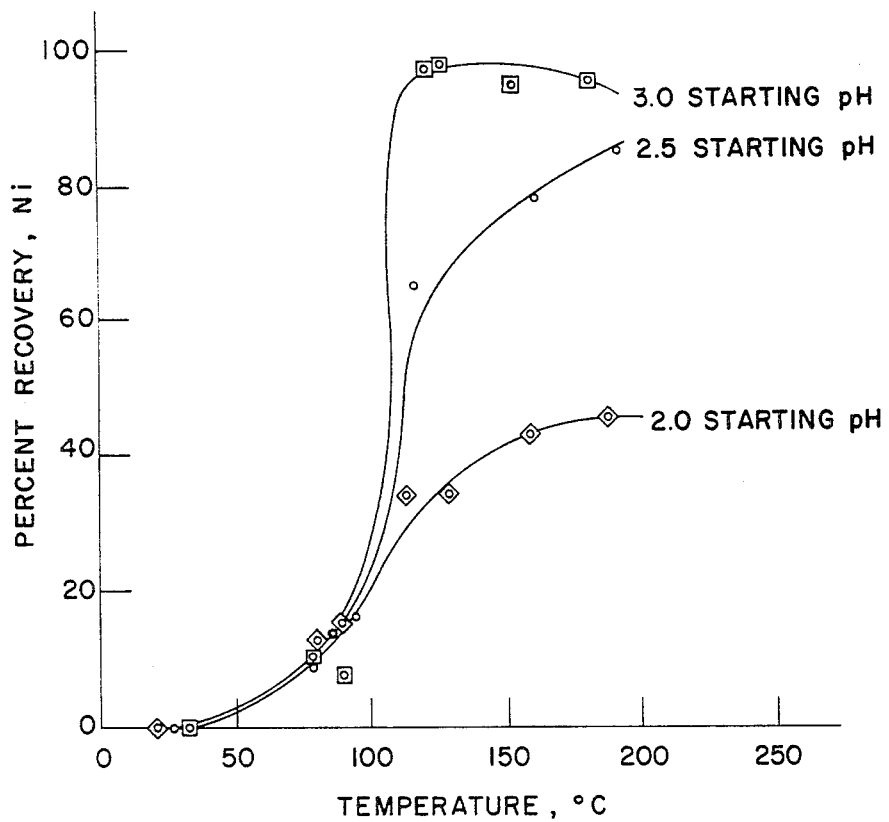

3,473,920
RECOVERY OF METALLIC NICKEL OR COBALT FROM SOLUTION OF CORRESPONDING SALT
Edward F. Fitzhugh, Jr., Cleveland Heights, Ohio, Don C. Seidel, Golden, Colo., and Fred N. Oberg, Platteville, Wis., assignors to Republic Steel Corporation, Cleveland, Ohio, a corporation of New Jersey
Continuation-in-part of application Ser. No. 718,262, Apr. 2, 1968, which is a continuation of application Ser. No. 477,399, Aug. 5, 1965, which in turn is a continuation-in-part of application Ser. No. 413,768, Nov. 25, 1964. This application July 22, 1968, Ser. No. 746,570
Int. Cl. C22b 23/04
U.S. Cl. 75—109  20 Claims

ABSTRACT OF THE DISCLOSURE

Nickel and/or cobalt is recovered from corresponding salt solutions by the addition of metallic iron at a temperature in the range of 100–300° C., preferably in the range of 155–180° C. Preferably the solution has a pH no greater than 3.5, and in no case greater than 5, and the iron is added in an amount of at least .05 times, preferably 1–2.5 times the equivalent amount of nickel in the solution. The use of these higher temperatures permits the precipitation of the nickel and/or cobalt in a much more efficient manner than is possible with the use of temperatures of 95° C. or less and which otherwise require an auxiliary precipitating agent. In view of the greater efficiency effected by the higher temperatures used in the process of this invention, it is not necessary to effect removal with any auxiliary agents which were previously used to improve the efficiency of precipitation by iron addition at the lower temperatures.

---

This inveniton relates to the recovery of nickel and/or cobalt from corresponding salt solutions. In most instances, this invention relates to a process for the preferential precipitation of metallic nickel from solutions containing nickel and cobalt salts. In some instances this invention relates to a process for the preferential precipitation of both metallic nickel and cobalt from a solution containing salts of nickel and cobalt and also salts of metals higher than iron in the electromotive series, such as Cr, Mg, Mn, Al, etc. More particularly, this invention relates to a process for the precipitation of metallic nickel from a solution containing a nickel salt with or without a cobalt salt, by the addition of metallic iron under specific temperature and acid conditions.

This application is a continuation-in-part of application Ser. No. 718,262, filed Apr. 2, 1968, now abandoned, which was a continuation of application Ser. No. 477,399, filed Aug. 5, 1965, now abandoned, which was a continuation-in-part of application Ser. No. 413,768, filed Nov. 25, 1964, now abandoned.

Because of the close similarity of properties, and the occurrence of both metals in various ores, mixtures of nickel and cobalt salts are quite common. In processes for recovering one or the other metal, the product generally contains a substantial proportion of the other metal since the properties of the two are so similar and related that chemical processing steps designed to recover one of the metals also extract the other metal.

For example, various leaching processes for recovering nickel from ores containing the same, generally result in a mixture of the cobalt as well as nickel generally in the metal salt forms. This is because the various steps of dissolving and precipitating or otherwise reacting nickel effect similar reactions with cobalt.

In view of the great demand for nickel and cobalt respectively in usable or saleable form, practical methods of recovering the respective metals from mixtures of the two have been sought. For certain purposes for which nickel is to be used, it is undesirable to have even small amounts of cobalt present. For example, stainless steels which are to be exposed to high energy radiation should be free of cobalt because of its ability to be made radioactive.

A number of methods for recovering nickel and cobalt and for subsequently separating the two have been developed. However, those involving acidic solutions have proved to be either quite expensive or otherwise unsatisfactory for commercial operation.

For example, present commercial processes involve a number of steps in the recovery of nickel from acidic solutions containing nickel and cobalt. In one case, the solutions are treated with hydrogen sulfide to recover the nickel in sulfide form. In addition to the corrosive and other undesirable characteristics of the hydrogen sulfide, it is necessary that the nickel in the sulfide product be converted to the metallic form. In another process, such as described in U.S. Patent 2,805,139, hydrogen reduction is used to recover nickel in metallic form from such acid solutions. Here, however, relatively high pressures, that is over 350 p.s.i. and temperatures of about 200° C., are used.

Various recovery processes are known for recovering the nickel from ammoniacal solutions. However, starting with acid leach solutions, considerable neutralizing reagents would be required with attendant expense to convert the nickel acid solution to ammoniacal solution and then to recover the metal therefrom. Also known are relatively expensive electrolytic and solvent extraction methods for separating nickel and cobalt from such mixtures.

De Merre U.S. Patent 2,757,080 discloses a process for separating nickel from solutions containing nickel and cobalt. This process involves the separation of nickel in the form of nickel sulfide, etc., by the addition of iron together with sulfur, arsenic, antimony selenium or tellurium. However, subsequent processing is required to convert the nickel from the sulfide to the metallic form.

In addition to the undesirable feature that the sulfur or other "ide" forming elements precipitate the nickel in the sulfide or other "ide" form, which requires additional processing steps to convert the nickel back to the metallic state, De Merre shows no temperature higher than 100° C.

While Hayward U.S. Patent 2,584,700 effects the precipitation of nickel from a sulfate solution of the two metals by the addition of metallic iron, here cobalt, nickel, chromium and aluminum are all precipitated simultaneously. There is no indication that by an appropriate selection of conditions one could preferentially precipitate metallic nickel and retain the cobalt and other metals in solution, or could preferentially precipitate the nickel and cobalt and retain in solution the chromium and aluminum and other metals higher than iron in the electromotive series.

Actually, Hayward is concerned with a process for preparing a pure grade of iron oxide and as one step in the process precipitates all metals other than iron from a ferrous sulfate solution which sulfate is eventually roasted to prepare the iron oxide. Furthermore, the temperature range found by applicants to give preferential precipitation is not disclosed by Hayward.

Lienhardt U.S. Patent 1,592,307 shows a process for precipitating nickel by the addition of metallic iron and a sulfate solution, preferably iron sulfate, added prior to the addition of the metallic iron. No temperature is disclosed in the patent higher than 95° C., and the nickel starting solutions are of much higher concentration.

Actually, Lienhardt's final solutions have a greater concentration of nickel than many of the solutions available commercially from which it would be desirable to precipitate the nickel. Thus even after precipitation is effected, the remaining solution contains a substantial amount of nickel. Actually in many commercial solutions from which it would be desirable to recover the nickel, the starting concentration is even less than the concentration remaining in the Lienhardt ultimate solutions. In other words Lienhardt is starting with much more concentrated solutions and is not teaching a process of precipitating nickel that would be efficient with the dilute solutions that are frequently available.

In accordance with the process of this invention, it has been found that nickel can be preferentially precipitated from acidic aqueous solutions containing both nickel and cobalt salts, such as the sulfate, chloride, nitrate, etc., with or without salts of certain other metals such as Fe, Cr, Al, Mg, Mn, etc., by the addition of metallic iron. It has also been found that nickel alone or together with cobalt can be preferentially precipitated from such solutions by the addition of metallic iron. The iron is added in an amount 0.05–3.0, preferably 1–2.5 times the stoichiometric amount based on the nickel in the solution, at a temperature in the range of 100–300° C., preferably 155–180° C. While reference is made to "acidic solutions" containing Ni, etc., it is intended to include slurries and leach pulps in which the Ni, etc. are dissolved in the liquid portion thereof.

While the precipitated product from the initial precipitation is a mixture of iron and nickel, this ferronickel powder can in some cases be used directly in the preparation of stainless steels, and otherwise can be so used after suitable heating to convert it to ferronickel alloy. Consequently, by a single operation, the nickel is recovered in a saleable or usable form. Where substantially pure nickel is desired, there are a number of simple methods available for removing the iron from this product.

While the solution of nickel salt can vary in concentration and also the solution can have various other salts therein, a typical solution on which the process of this invention can be practiced contains nickel, approximately $\frac{1}{20}$ as much cobalt as nickel, and varying amounts of iron, magnesium, chromium, manganese, silica and the sulfate radical. Although the recovery of nickel and cobalt can be carried out in a single step, it is prefered to do this in at least two steps so as to attain preferential precipitation of the nickel.

In a preferred modification of this invention using a two-stage procedure, powdered metallic iron is reacted in the first step with the acidic solution for about an hour at a temperature in the 160–180° C. range. The reaction is conducted in a closed vessel and the pressure is essentially the ambient steam pressure with the temperature that is used. Sufficient agitation is provided to keep the iron in suspension.

The amount of iron added is advantageously from 1 to 2.5 times the stoichiometric quantity based on the amount of nickel in the starting solution. In the resultant reaction the iron displaces nickel and a very much smaller amount of cobalt from the solution. The solids resulting from this reaction generally contain up to 60% nickel and an amount of cobalt equivalent to $\frac{1}{150}$ or less based on the amount of nickel present, with the remainder being undissolved iron. These solids may be separated from the solution, dried and either briquetted, melted or otherwise prepared for use. They may also be recirculated to achieve a higher proportion of nickel to iron.

In the second stage of this preferred modification, the solution remaining from the first precipitation is treated with about the same weight of iron as used before. Here, however, as the concentration of the nickel in the solution decreases, more cobalt is extracted from the solution.

Where it is desired to scavenge the cobalt and the amount of nickel remaining in solution after the first or other prior precipitations of nickel in metallic form, the cobalt and the remaining nickel may be precipitated by the addition of iron and sulfur, provided that it is not objectionable to recover the cobalt and the remaining nickel in the form of the sulfide. As explained above in connection with the De Merre patent, the addition of sulfur results in the formation of a precipitate of the nickel and cobalt in sulfide form which necessitates additional processing if the metal is to be eventually converted to the metallic form.

Thus in a second or third precipitation, after there have been one or two precipitations of nickel in the metallic form by the addition of iron without sulfur, about 0.5 times the stoichiometric amount of sulfur based on the nickel and cobalt content in the solution can be added together with additional iron to expedite and increase the precipitation of cobalt and the remaining nickel. However this is not a recommended procedure in view of the disadvantages recited above and is mentioned only as an alternative subsequent processing step to scavenge minor quantities of nickel and cobalt remaining in solution after the major prior precipitations thereof.

If sulfur is not added in such subsequent steps, the precipitate is a mixture of metallic nickel, iron and cobalt. When a very limited amount of sulfur is added, the product may contain both metallic nickel, iron and cobalt, and also contain sulfides of nickel and cobalt. When substantial amounts of sulfur are added, the precipitate contains the iron and cobalt primarily in the sulfide state. In any case, the mixed solids can be separated from the solution and processed further according to known methods.

As discussed hereinafter, the presence of elemental sulfur even in very small amounts has the disadvantage of affecting the type of nickel precipitated. Thus, even if there is not sufficient sulfur to cause the nickel to precipitate in the nickel sulfide form, it can have the effect of having the metallic nickel precipitated in a nonmagnetic form which precludes the use of a preferred magnetic separating process for the recovery of the metallic nickel. For example, if 0.5 or more of the stoichiometric amount of sulfur is present, the nickel is precipitated in a nonmagnetic form. If a high proportion of sulfur is present, the nickel is precipitated as the sulfide. However, if less than 0.35 of the stoichiometric proportion is present, based on the nickel content, then the nickel can be precipitated as magnetic nickel.

Total recoveries in the two stages wherein only iron is added are typically 98% or more of the nickel and 50–60% of the cobalt. However, the major part of the nickel is recovered in the first precipitation before appreciable amounts of cobalt are precipitated in the second stage.

In the drawings, FIG. 1 is a curve plotted to show the effect of pH variation in the starting solution on the percent nickel recovery based on the amount present in the original solution.

FIG. 2 is a curve showing the effect of the starting pH on the ratio of nickel to cobalt in the precipitate.

FIG. 3 is a curve showing the effect of the stoichiometric equivalent of iron added on the percent recovery of nickel in the initial precipitate.

FIG. 4 shows three curves of values plotted for percent recovery of nickel as the temperature is increased using solution of three different starting pH's.

In obtaining the values for these curves the conditions under which they are determined are, except for the specific conditions recited in the legend on the drawings, those described in Example II.

The process of this invention will work on solutions of a fairly large pH or acid range. In most cases, however, the pH is preferably under 5. Above a pH of 5, the addition of iron may cause the formation and precipitation of some undesirable hydroxide. Advantageously the pH range is between 1.5 and 3.5, preferably about 2–3. However, there is actually no limit to the starting acidity since at pH's even below 1.5, the addition of iron can neutralize some of the acid until a pH range is reached that is more suitable for the process of this invention. Consequently, while the desired acid range is 1.5–3.5, the use of solutions initially having a low pH merely means that more iron is added, first to bring the acidity within the desired pH range and then to effect the nickel precipitation as described herein. However, other means for bringing the solution into the desired pH range can also be used.

In batch operations, the reaction has been advantageously started with a solution pH of about 2. This rises to about 3 at the end of the first precipitation. Regardless of the number of precipitation steps, the terminal pH is about 4–6. It is generally preferable that the amount of iron added is not more than about 3.5 times the stoichiometric amount calculated to replace the nickel.

The particle size of the iron has an effect in that the reaction between the iron and the nickel salt solution is a surface reaction. Therefore, all other factors being equal, the reaction rate generally increases with smaller particle sizes because of the greater area presented. Reaction takes place even with large particles but at a slower rate. An advantageous particle size is found to be less than 100 mesh. In addition to the particle size there are other characteristics such as purity and carbon content of the iron which affect the reaction rate. Low carbon iron powder is preferred for this purpose.

Where there is to be preferential precipitation of nickel with respect to cobalt, the iron powder is added in an amount 0.05–3.0 times, preferably 1–2.5 times, the stoichiometric quantity required to replace the nickel in solution. The initial precipitate may range up to about 60% nickel with the balance being mostly iron and with a very minute amount of cobalt equivalent generally to no more than 0.6% of the weight of nickel recovered and very often even much less. The iron content represents undissolved iron. This precipitated product is separated from the solution. The recirculation of this powdered solid product may be practiced where it is desired to achieve a higher proportion of nickel to iron.

While the initial precipitate, using 1.5–2.5 times the stoichiometric amount of iron based on the original nickel content of the solution, gives a precipitate sufficiently free of cobalt for most uses, i.e., generally about 200–600 parts of nickel per part of cobalt, it is possible by using less iron in the initial precipitation, for example 0.5–1 times the stoichiometric amount, to precipitate a smaller amount of the nickel, but of a type containing even less cobalt. A number of subsequent precipitations can then be performed to recover additional nickel, and eventually a substantial portion of the cobalt. Consequently, there may be a number of precipitations of nickel by the stepwise addition of various proportions of iron powder with the earlier precipitations giving a product containing less cobalt than in the later stages.

Conversely, substantially much of the cobalt can be precipitated by using a greater amount of iron in the initial precipitation. In such cases, however, we have less preferential separation of the nickel from the cobalt. In such cases 3.0–5 times the stoichiometric amount is advantageously used.

The nickel remaining in the solution after the initially precipitated nickel has been removed can be recovered by a second treatment which usually involves the addition of 1 to 2 times the stoichiometric amount of iron based on the amount of nickel in the original first stage solution.

In the initial precipitation, by using 1.5–2.5 times the stoichiometric amount of iron, 85–95% of the nickel in solution is generally recovered as precipitated metallic nickel. The recovery of nickel from the residual solution by the addition of more iron can be substantially completed in a second precipitation using 1 to 2 times the stoichiometric amount of iron based on the nickel in the original solution. While the total cobalt recovery in the two stages is often 50–60% of the original content, these percentages will vary according to the higher or lower concentration of the metal in the starting solution.

In most cases a reaction time of 30–90 minutes is sufficient for each precipitation.

A typical solution from which the above recoveries are obtained is one containing approximately 20 parts of nickel per part of cobalt, together with various proportions of iron, magnesium, manganese, chromium and silica. Since many of such nickel-cobalt solutions or mixtures are the result of leaching operations, such solutions generally have the metals in the form of the sulfates or chlorides. Although reference is made to solutions containing approximately 20 parts of nickel to 1 part of cobalt, solutions containing various other proportions, including much larger proportions of cobalt can also be treated in the process of this invention with similar preferential precipitation of the nickel. While the process is more effective with solutions having higher nickel concentrations, this process can be applied to solutions having as little as 0.5 gm. per liter of nickel in the starting solution.

The critical importance of temperature in the practice of this invention is illustrated by the curves plotted in FIG. 4. These curves emphasize the sharp improvement in nickel recovery for temperatures above 100° C. as compared with temperatures below 100° C. These sharp increases in recovery of nickel could not be predicted from the prior art, and are startlingly unexpected and unpredictable from the teachings of the prior art.

These curves are plotted for three different starting pH's. The least favorable of the three starting pH's is the pH of 2.0. The curve for this set of values shows at 80° C., a recovery of about 10% nickel; at 90° C., a recovery of about 18% nickel; at 100° C., about 20% recovery; at about 120° C., about 35% recovery; and at about 160° C., about 42% recovery.

The curve for the 2.5 starting pH shows a much sharper rise in recoveries over 100° C. For example, at 80° C. the recovery is about 8%; at 90° C. the recovery is about 14%; at 95° C. the recovery is about 16%; at 110° C. the recovery is about 62%; and 160° C. the recovery is about 78%; and at 180° C. the recovery is over 80%.

The curve for the starting pH of 3.0 shows an even sharper rise for temperatures above 100° C. For 80° and 90° C. the recovery is below 10%; at about 100° C. the recovery is about 28%; and at 110° C. the recovery is about 95%.

The invention is best described by the following examples. These examples are presented merely for purposes of illustration and are not intended in any way to limit the scope of the invention nor the manner in which it can be practiced. Unless specifically indicated otherwise, parts and percentages are given by weight. In the following examples, the experiments are performed in a 2-liter autoclave reactor made of 316 stainless steel and having a double impeller. The reactor is a standard one commercially available as Parr 2L reactor 316SS. The recovery of the powder is facilitated by using a glass liner, but the reaction solution can be directly in contact with the stainless steel. It is often desirable to bleed some of the steam from the reactor at an early stage to sweep out the initially contained air and thereby provide a more reducing atmosphere. The pressure maintained in the reactor is advantageously at least the ambient pressure under the conditions of the reaction. For example, at 150° C. the ambient pressure is approximately 95 p.s.i. Where there may be some leakage in the reactor with resultant drop in pressure this may be compensated for by feeding hydrogen in at sufficient pressure to maintain what would be ambient pressure without such leakage.

EXAMPLE I

Into the 2-liter autoclave described above there is placed one liter of a leach solution containing:

| | Gms. |
|---|---|
| Ni | 2 |
| Co | 0.1 |
| Fe | 0.25 |
| Mg | 11.0 |
| Cr | 0.01 |
| Mn | 0.25 |
| Si | 0.1 |
| SO$_4$ | 52.0 |

To this solution which has an adjusted pH of 2.6 is added 3.8 gms. of finely divided low carbon iron (2 times the equivalent of the nickel in solution). The autoclave is closed and with sufficient agitation to keep the iron powder in suspension the temperature is raised to and maintained at approximately 160° C. for 45 minutes. The resultant solids are recovered by filtration to give a ferronickel powder having a nickel content of 45.4% with the balance primarily iron and a cobalt content of 0.48% which is equivalent to 1 part per 95 parts of the nickel present. The nickel in the precipitated product represents 97.3% of the nickel in original solution. After this precipitation, the pH is 5.4. The Mg, Cr, Mn and Si remain in the solution.

EXAMPLE II

To illustrate the critical effect of temperature in the process of this invention, a number of experiments are performed using the procedure and conditions of Example I except that the starting pH's are 2.0, 2.5 and 3.0 respectively for three series of experiments in which the temperatures are varied from room temperature up to 180° C. or 200° C., and the percent Ni recovery determined in each case. The results are plotted in the three curves shown in FIG. 4.

EXAMPLE III

The procedure of Example I is repeated a number of times using a similar solution for factorial tests, with pH adjusted to 1.8, to show the effect of time, temperature and the amount of iron added. These conditions, as well as the percent nickel in the product and the percent recovered nickel based on starting nickel content, are also shown in Table I below.

TABLE I

| Stoichiometric Equivalents of Fe | Temp., ° C. | Time, Min. | Percent Ni in Product | Percent Ni Recovered |
|---|---|---|---|---|
| 1.7 | 180 | 90 | 37.0 | 38.9 |
| 2.8 | 180 | 30 | 38.9 | 84.4 |
| 1.7 | 155 | 30 | 37.6 | 40.5 |
| 2.8 | 155 | 90 | 38.2 | 89.4 |

The factorial tests run in Example III show the major effect in the range of these experiments is determined by the amount of iron added. For example, by selecting a base level of 2.3 equivalents of iron based on the nickel in solution, the increase from this base level to 2.8 equivalents increases the nickel recovery by about 23.6%.

The next important variable in these factorial tests is the temperature. The results show that decreasing the temperature from a base level of 180° C. to 155° C. increases the recovery by about 1.7%. In this temperature range of 155–180° C. the temperature seems to be a minor influence. However, as described herein and as illustrated by Example II it is critical that the temperature be within the range of 100–300° C., preferably 155–180° C.

Increasing the reaction time from the 60 minute base level to 90 minutes increased the nickel recovery by about 0.9%. Here again this seems to be a minor factor within the selected range.

EXAMPLE IV

A number of tests are performed with all conditions similar to those in Example I, except as indicated in Table II below. The percentage nickel in the precipitated product and the percent recovery of nickel based on the original nickel content of the starting solution are also indicated. In the first three of these tests, the stoichiometric ratio of iron is held practically constant and the nickel content is varied at approximately 2, 3 and 4 gms. per liter. In the second three experiments, the same nickel percentages are used, but the Fe/solution ratio is held constant with a resultant variation in the stoichiometric amount of iron.

TABLE II*

| | Ni in Sol., Gms./liter | Stoichiometric Fe | Percent Ni in Product | Percent Ni Recovered |
|---|---|---|---|---|
| Constant Fe Stoichiometric | 2.07 | 1.90 | 49.7 | 93.6 |
| | 3.07 | 1.95 | 54.6 | 96.3 |
| | 4.10 | 1.97 | 47.3 | 100.0 |
| Constant Fe/Solution Ratio | 2.07 | 2.90 | 36.8 | 98.3 |
| | 3.07 | 1.95 | 54.6 | 96.3 |
| | 4.10 | 1.47 | 64.9 | 96.3 |

*In each case the starting pH is 2.0.

In each case, the cobalt in the precipitated product is less than one percent of the nickel in the product.

EXAMPLE V

A series of tests are run using a solution similar to that of Example I with a temperature of 165° C., a reaction period of 1 hour, and an iron equivalence of 2.7 based on the nickel content. However, the starting pH is adjusted in each case to values of 1.8, 2.0, 2.2 and 2.4, respectively. The percent nickel recovery based on the amount in the original solution is determined in each case and the values plotted as shown in FIG. 1 of the drawings. In these same experiments, the Ni/Co ratio in the precipitated product is also determined and the corresponding values plotted as shown in FIG. 2. These two curves show that while the percent recovery of nickel is lower with a lower starting pH, the ratio of nickel to cobalt in the precipitated product is much higher with lower pH. Also with higher starting pH's the percent nickel recovery increases, but the Ni/Co ratio drops off considerably with the higher pH's.

EXAMPLE VI

A series of experiments are performed in accordance with the procedure of Example I except that the starting pH is 2.0 and the amount of iron is varied to determine the effect of variations in equivalents of iron added with regard to the percent recovery of nickel. The equivalents of iron added per equivalent of Ni in the solution are in the amounts of 1, 1.3, 1.6, 2, 2.5, 2.7, 2.9, 3, 3.2 and 3.5, respectively. The curve obtained by the plotting of these points against the respective percent recoveries of nickel is that in FIG. 3. The values show that as the number of equivalents of iron is increased, the recovery of nickel is increased until substantially complete precipitation of nickel is effected.

EXAMPLE VII

The procedure of Example I is repeated starting with a solution in which the nickel and the various other metal components are in the form of chlorides.

The starting pH is 2.5; the iron addition is 3.806 grams (2 times the stoichiometric amount of Ni); the precipitation temperature is 160° C. and the precipitation time is 45 minutes.

The starting solution has the following composition and the recovery results are given below.

| Metal components as chlorides: | Gms./liter |
|---|---|
| Ni | 2.0 |
| Fe | 11.4 |
| Mg | 2.5 |
| Percent recovery of nickel | 98.4 |
| Product grade, percent nickel | 41.2 |

The nickel-bearing precipitate produced by the process of this invention can be separated from the remaining solution by any convenient means including filtration, decantation, magnetic separation, flotation, etc.

Although filtration and the various other methods are practical, magnetic separation is particularly advantageous and can be practiced with commercially available equipment. For such separations, it is desirable to have the nickel precipitated in a form as completely magnetic as possible. Nevertheless, where the precipitate has the nickel in both magnetic and nonmagnetic forms it is possible to recover that portion of the precipitate which is magnetic by magnetic separation means and the remainder or nonmagnetic portion by other means, such as filtration.

Standard methods can be used for conducting the magnetic separation of the products of this invention. In the tests described herein in which magnetic separations are effected, a commercially available Davis tube wet magnetic separator is used. A 3-stage roughing technique with one stage of cleaning on the rougher product is used. The nonmagnetic fraction is filtered and washed and various samples of the magnetically removed product, the nonmagnetic tails and the tails liquor are analyzed for nickel and cobalt.

It appears that the presence of elemental sulfur in the nickel solution at the time iron is added for precipitation has an effect on whether the nickel precipitate is magnetic or nonmagnetic. If the solution contains or has a substantial amount of elemental sulfur suspended therein, or if a substantial amount of sulfur is added with the iron, the resulting precipitate is only partially magnetic. For example, if no more than about 0.35 of the stoichiometric amount of sulfur, based on the nickel content, is present during the precipitation, the entire nickel precipitate is separable from the solution by magnetic means. Magnetic separation is advantageous in that it avoids any need to clarify the metal-bearing solution.

If 0.5 or slightly more of the stoichiometric amount of sulfur is present, only a partial separation of nickel can be made by magnetic means. If substantially more sulfur is present, the nickel is precipitated in the sulfide form and there are the disadvantages of further processing to convert the Ni to the metal form as discussed above in connection with the De Merre patent.

Therefore, where it is desired to recover the nickel from the precipitate by magnetic means, it is desirable that there be present no more than about 0.35 times the stoichiometric amount of elemental sulfur on the basis of the nickel contained in the solution. The following Example VIII illustrates the effect of varying the amount of sulfur on the proportions of magnetic and nonmagnetic nickel in the precipitate resulting from simultaneous addition of iron to a solution containing nickel.

EXAMPLE VIII

A synthetic solution is prepared having a concentration of components identical with that shown in Example I. This solution is prepared synthetically in order to avoid the presence of any elemental sulfur in the starting solution. The initial pH is 2.0, the maximum temperature is 165–166° C., the time for which the temperature is maintained is 60 minutes, and the type of iron used in each case is identical. The proportions of iron and sulfur used and the various results obtained are given in the following table.

| Times Stoichiometric for Ni Contained | | Precipitate | | | | |
|---|---|---|---|---|---|---|
| Iron | Sulfur | Kind | Percent of Total | Percent Ni Analysis | Percent Recovery Ni | Ni/Co |
| 3.41 | 0.25 | Magnetic | 100.0 | 31.2 | 100.0 | 13 |
| 3.00 | 0.50 | Magnetic | 52.9 | 19.7 | 35.1 | 24 |
|  |  | Nonmagnetic | 47.1 | 38.1 | 60.4 | 15 |

EXAMPLE IX

To demonstrate that the nickel-and-cobalt-bearing solutions need not be clarified to respond to this process, two ore pulps or unfiltered slurries having substantially the same concentration of ingredients in the liquid phase that is shown in Example I are treated for precipitation of the nickel and cobalt with iron and the precipitated product recovered by magnetic separtion. In each case the pulp percent solids is 22. The amount of iron added is 3.2 times the stoichiometric equivalent. The reaction temperature is 150° C. and the reaction time is 45 minutes. In the magnetic separation, a Davis tube unit is used with a field strength of 6000+ gauss, and for cleaning, a wash water flow of 500 ml./min. and an agitation of 50 strokes per minute are used for a cleaning period of 3 minutes. The initial pH, the pH after adjustment and the various results obtained are given in the following table.

|  | A | B |
|---|---|---|
| Initial pH of leach solution | 1.75 | 1.7 |
| pH after adjustment | 2.2 | 2.1 |
| Results from magnetic separation: Percent Ni in magnetic product | 20.4 | 18.1 |
| Percent Distribution of Ni: | | |
| In magnetic product | 83.7 | 83.6 |
| In nonmagnetic product | 16.3 | 16.4 |
| In tails liquor | Trace | Trace |

The ferronickel powder recovered from an initial precipitate can be upgraded by using this powder as the source of iron for a subsequent precipitation. For example, a ferronickel obtained from an initial precipitation and containing about 33% nickel is used in precipitating nickel from a second solution. The precipitate from the second solution contains 41% nickel. Furthermore, about 40% of the cobalt which was in the original precipitate is removed during the course of the reaction so that in addition to upgrading the nickel on the basis of the nickel-iron content, the Ni/Co ratio is likewise improved to the extent that the Ni/Co ratio of the final product is nearly double that of the original precipitate.

The process of this invention can be operated either continuously or batchwise.

Another advantage of the process of this invention is the fact that if there is copper present in the starting solution, this can be removed by treating the starting solution with iron at ambient temperature to effect the precipitation of the copper. At this temperature and even at somewhat higher temperatures as illustrated in Example II, little or none of the nickel and cobalt are precipitated by iron.

As previously stated, an outstanding advantage of this process is that a saleable or usable metallic form of nickel can be produced by a simple one-step process from an acidic solution of nickel and cobalt salts. Moreover, this is a more economical process than any other process for recovering the nickel.

After one or more precipitations with iron as described above, the remainder of the nickel and the major part of the remaining cobalt can be recovered either by the use of additional iron or by scavenging with a combination of iron and sulfur. In such case, the amount of iron is advantageously in the range of 1–2.5 times the equivalent amount of nickel in the original solution. The addition of sulfur in combination with the iron serves to increase the recovery of cobalt in this stage with the resultant precipitate being partly metal and partly sulfides of cobalt and nickel, the proportions depending on the amount of sulfur used. This precipitate, which also contains iron, must be further refined if it is desired to convert the nickel and cobalt completely to the metal form.

There are instances in which it is desirable to recover metallic nickel from solutions containing a nickel salt but no cobalt. This invention can likewise be used to precipitate metallic nickel therefrom in the same manner as described above.

Again, it may be desirable to recover cobalt from solutions containing a cobalt salt, but no nickel. This invention can be then used to precipitate metallic cobalt in the manner described above.

EXAMPLE X

The procedure of Example I is repeated using a solution containing per liter of solution the following:

| | Gms. |
|---|---|
| Co | 2 |
| Fe | 0.25 |
| Mg | 11.0 |
| Cr | 0.01 |
| Mn | 0.25 |
| Si | 0.1 |
| $SO_4$ | 52.0 |

To this solution having a pH of 2 is added 5.66 gms. finely divided low carbon iron (3 times the equivalent of the cobalt in solution). The other conditions of Example I are applied. The precipitate represents 88.5% of the cobalt and analyzes to 26.9% cobalt. The Mg, Cr, Mn and Si remain in solution.

It is also possible, as previously indicated, to precipitate both the nickel and cobalt simultaneously instead of preferentially by adding greater proportions of iron. In each of these instances, the precipitation can be effected preferentially in the presence of salts of meals higher than iron in the electromotive series.

While certain features of this invention have been described in detail with respect to various embodiments thereof, it will, of course, be apparent that other modifications can be made within the spirit and scope of this invention and it is not intended to limit the inventon to the exact details shown above except insofar as they are defined in the following claims.

The invention claimed is:

1. The process for the preferential separation of nickel in metallic form from an acidic solution containing nickel and cobalt salts comprising the steps of:
   (a) adding metallic iron to said solution;
   (b) maintaining a temperature in the range of 100–300° C. and a pressure of at least the ambient steam pressure for the temperature being maintained;
   (c) continuing the resultant reaction until a substantial amount of metallic nickel has been precipitated from said solution; and
   (d) thereafter separating said precipitate from said solution.

2. The process of claim 1 in which said temperature is in the range of 155–180° C.

3. The process of claim 1 in which said salts are the sulfate salts.

4. The process of claim 1 in which said salts are the chloride salts.

5. The process of claim 1 in which said acidic solution has a pH no greater than 5.

6. The process of claim 1 in which said acidic solution has a pH no greater than 3.5.

7. The process of claim 1 in which said iron is in a finely divided state.

8. The process of claim 7 in which said iron is added in an amount of at least 0.05 times the equivalent weight of the nickel contained in said solution.

9. The process of claim 7 in which said iron is used in an amount equivalent to 1–2.5 times the amount of nickel in said solution.

10. The process of claim 7 in which said iron is used in an amount equivalent to at least 0.05 times the amount of nickel in said solution and said temperature is in the range of 155–180° C.

11. The process of claim 7 in which said iron is used in an amount equivalent to 1–2.5 times the amount of nickel in said solution and said temperature is in the range of 155–180° C.

12. The process of claim 7 in which said finely divided iron is a ferronickel powder obtained by the addition of iron powder to an acidic solution of a nickel salt.

13. The process of claim 7 in which said precipitate is separated from said solution and additional nickel is precipitated by the further addition of finely divided metallic iron to the remaining solution.

14. The process of claim 13 in which the amount of iron added in such further addition is at least 0.05 times the equivalent of nickel contained in the original nickel solution.

15. The process of claim 1 in which said nickel is preferentially precipiated from said solution with the major part of said cobalt being retained in said solution.

16. The process of claim 1 in which said solution also contains in salt form at least one metal higher than iron in the electromotive series and both said nickel and said cobalt are preferentially precipitated and each said metal higher in the electromotive series than iron is substantially retained in said solution.

17. The process for the preferential separation of nickel in metallic form from an acidic solution containing a nickel salt and at least one salt of a metal higher in the electromotive series than iron comprising the steps of:
   (a) adding metallic iron to said solution;
   (b) maintaining a temperature in the range of 100–300° C. and a pressure of at least the ambient steam pressure for the temperature being maintained;
   (c) continuing the resultant reaction until a substantial amount of metallic nickel has been precipitated from said solution; and
   (d) thereafter separating said precipitate from said solution.

18. The process of recovering metallic nickel from a solution containing a nickel salt comprising the steps of:
   (a) adding metallic iron to said solution;
   (b) maintaining a temperature in the range of 100–300°

C. and a pressure of at least the ambient steam pressure for the temperature being maintained;

(c) continuing the resultant reaction until a substantial amount of metallic nickel has been precipitated from said solution; and (d) thereafter separating said precipitate from said solution.

19. The process for the preferential separation of cobalt in metallic form from an acidic solution containing a cobalt salt and at least one salt of a metal higher in the electromotive series than iron comprising the steps of:

(a) adding metallic iron to said solution;

(b) maintaining a temperature in the range of 100–300° C. and a pressure of at least the ambient steam pressure for the temperature being maintained;

(c) continuing the resultant reaction until a substantial amount of metallic cobalt has been precipitated from said solution; and (d) thereafter separating said precipitate from said solution.

20. The process of recovering metallic cobalt from a solution containing a cobalt salt comprising the steps of:

(a) adding metallic iron to said solution;

(b) maintaining a temperature in the range of 100–300° C. and a pressure of at least the ambient steam pressure for the temperature being maintained;

(c) continuing the resultant reaction until a substantial ambount of metallic cobalt has been precipitated from said solution; and (d) thereafter separating said precipitate from said solution.

References Cited

UNITED STATES PATENTS

| | | | |
|---|---|---|---|
| 1,592,307 | 7/1926 | Lienhardt | 75—109 |
| 2,757,080 | 7/1956 | De Merre | 75—119 |
| 2,829,965 | 4/1958 | Custagna | 75—109 |
| 2,960,400 | 11/1960 | Reynaud | 75—109 |
| 3,041,138 | 6/1962 | Corbiau | 75—109 |
| 3,117,000 | 1/1964 | Schlain | 75—109 |

L. DEWAYNE RUTLEDGE, Primary Examiner

T. R. FRYE, Assistant Examiner

U.S. Cl. X.R.

75—119